United States Patent [19]
Hara et al.

[11] Patent Number: 5,490,143
[45] Date of Patent: Feb. 6, 1996

[54] MULTIPLEX TRANSMISSION METHOD AND A SYNCHRONIZING METHOD IN MULTIPLEX TRANSMISSION

[75] Inventors: Toshitaka Hara; Yutaka Matsuda; Kyosuke Hashimoto; Hiroo Moriue, all of Hiratsuka; Yoshikazu Nobutoki, Higashihiroshima; Hiroaki Sakamoto, Fukuyama; Koji Terayama; Hideki Nakazono, both of Hiroshima, all of Japan

[73] Assignees: The Furukawa Electric Co., Ltd, Tokyo; Mazda Motor Corp., Hiroshima, both of Japan

[21] Appl. No.: 240,492

[22] Filed: May 10, 1994

Related U.S. Application Data

[63] Continuation of Ser. No. 960,549, Oct. 13, 1992, abandoned.

[30] Foreign Application Priority Data

Oct. 15, 1991 [JP] Japan ..................... 3-265992
Oct. 15, 1991 [JP] Japan ..................... 3-265993

[51] Int. Cl.$^6$ ..................................... H04J 3/06
[52] U.S. Cl. ............ 370/85.2; 370/100.1; 375/368
[58] Field of Search ................. 370/85.2, 85.6, 370/85.3, 60, 94.1, 110.1, 100.1, 103, 105.1, 85.1, 105.4, 105.5, 48; 340/825.5; 375/106, 107, 110, 116, 118; 371/21.3, 46, 42, 20.4, 37.1

[56] References Cited

U.S. PATENT DOCUMENTS

| | | | |
|---|---|---|---|
| 4,412,326 | 10/1983 | Limb | 370/85.3 |
| 4,719,458 | 1/1988 | Miesterfeld et al. | 370/85.2 |
| 4,719,620 | 1/1988 | Machino et al. | 370/85.2 |
| 4,941,143 | 7/1990 | Twitty et al. | 370/85.2 |
| 5,063,561 | 11/1991 | Kimmo | 370/85.6 |

OTHER PUBLICATIONS

Elektronik. vol. 38, No. 4, Feb. 17, 1989, Munchen DE. pp. 102–105, F. Beil et al, "Eine bitserielle Universal–Schnittstelle nicht nur fur Kfz–Anwendungen.".
Elektronik, vo. 39, No. 12, Jun. 8, 1990, Munchen, DE. pp. 134–137, W. Lawrenz "Auto–Busse" in der Industrie.

*Primary Examiner*—Douglas W. Olms
*Assistant Examiner*—Dang Ton
*Attorney, Agent, or Firm*—Frishauf, Holtz, Goodman, Langer & Chick

[57] ABSTRACT

When a message is transmitted, frame by frame, from any one (10) of a plurality of multiplex nodes to a common multiplex bus (MB) to which the multiplex nodes are connected, each of the multiplex nodes (20 and 30) determines that transmission of a frame therefrom is allowed when it detects a transmission permission signal (b, b') added to the frame after detection of and idle state of the multiplex bus, and starts transmitting a message data frame. This makes it possible to properly implement priority-based control according to the priority levels of the data frames irrespectively of variations in the reference clocks of the multiplex nodes. Further, receiving multiplex nodes perform frame synchronization at the rise of a special code (a) of a start code (SOM) of a message data frame, and then perform re-synchronization at the rise of a special bit pattern (b") which includes a passive bit and a dominant bit. This prevents synchronization from being deviated and bit errors resulting from deviated synchronization, thus leading to higher reliability of multiplex transmission.

4 Claims, 8 Drawing Sheets

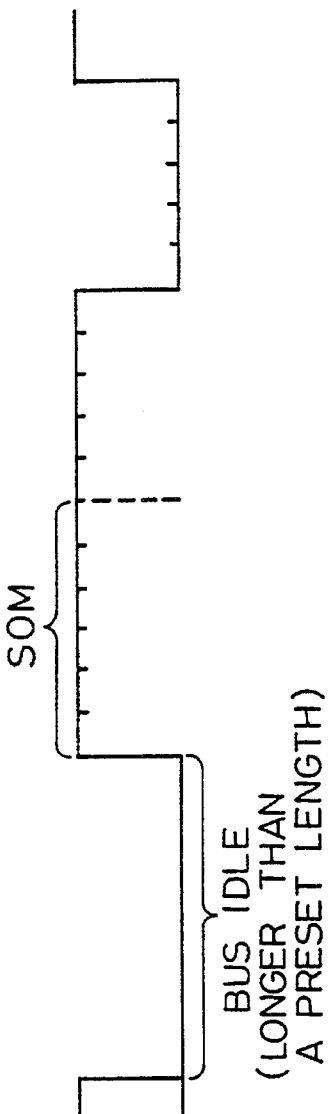
FIG. 1(a)
CONFIGURATION OF THE MESSAGE FRAME
FIG. 1(b)
WAVEFORM ON THE MULTIPLEX BUS

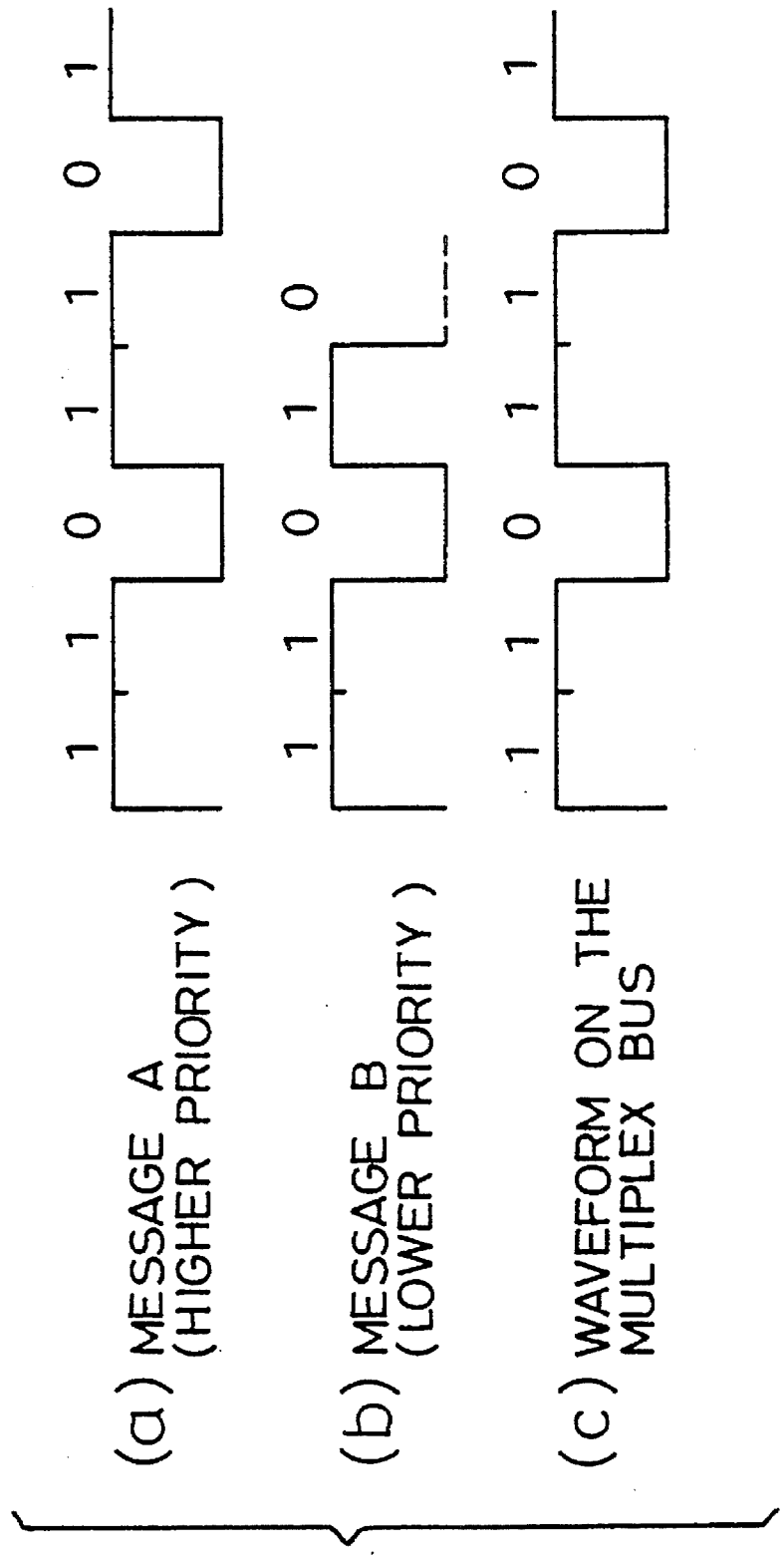

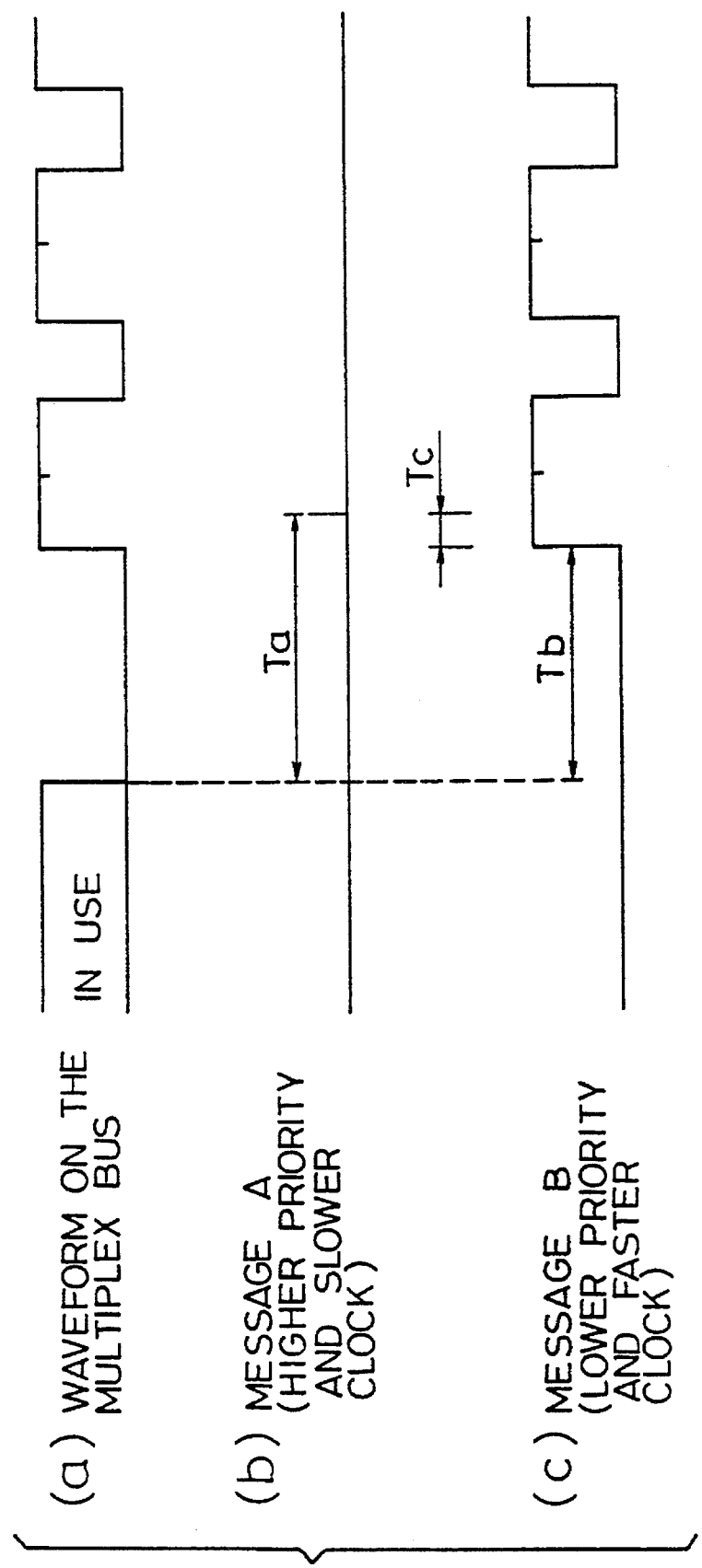

MULTIPLEX TRANSMISSION METHOD AND A SYNCHRONIZING METHOD IN MULTIPLEX TRANSMISSION

This application is a Continuation of application Ser. No. 07/960,549, filed Oct. 13, 1992 now abandoned.

BACKGROUND OF THE INVENTION

The present invention relates to a multiplex transmission method based on the "non-destructive arbitrative CSMA/CD (Carrier Sense Multiple Access with Collision Detection) transmission system" and to a synchronizing method for multiplex transmission.

In recent years, with the rapidly growing car electronics, increased units and larger harnesses are becoming problems. As automotive multiplex transmission methods which can solve the aforementioned problems with the transmission systems and which provides higher reliability and versatility, various distributed control type LANs (Local Area Networks) have been proposed. Among them, a non-destructive arbitrative type CSMA/CD has attracted the industry's attention and it is extensively used because of its satisfactory open system (for instance, even if a node is added or deleted due to variations such as different grades or different destinations in the same car model, it is not necessary to change the remaining nodes), responsiveness and versatility.

In the non-destructive arbitrative CSMA/CD transmission system, each multiplex node starts the transmission of data frame by frame when it confirms that the use of a multiplex transmission line (multiplex bus) consisting of twisted paired wires or the like has already ended and the transmission line has stayed in an idle state for longer than a predetermined length of time, as shown in FIG. 1 (b). Then, the multiplex node compares its own transmission waveform with that on the multiplex transmission line for each bit, and if the two waveforms disagree, then the multiplex node determines that it is a signal collision and interrupts the transmission, then goes back to verify the idle state. A multiplex node, that is transmitting a signal with a higher priority level, finds that the waveform on the multiplex bus is the same as the signal of its own node; therefore, it does not detect any collisions and it continues transmission.

When the aforementioned transmission method is applied to data transmission in a motorcar wherein the transmission distance is short and the transmission speed is relatively slow, all multiplex nodes can observe a signal on the multiplex bus at the same time, permitting improved efficiency of use of the line. This transmission method is also advantageous in that it does not require a complicated control procedure such as random back-off.

As described above, according to the non-destructive arbitrative type CSMA/CD system, if messages are sent out from a plurality of multiplex nodes to the multiplex bus common to these nodes, priority-based control is performed. For instance, as shown in FIG. 2, when a message A with a higher priority level (see FIG. 2 (a)) competes with a message B with a lower priority level (see FIG. 2 (a)) in transmission on the multiplex bus, the priority control is carried out so that the message with the higher priority level is transmitted (see FIG. 2 (c)).

In an actual system, however, the length of a bit of a reference clock may change due to variations in the device of a clock generating source or other causes. For example, if a message A with a higher priority level sent from a multiplex node with a reference clock generated later and a message B with a lower priority level sent from a multiplex node with a reference clock generated earlier are placed in a transmission wait state as shown in FIG. 3, and if the reference clocks of the two multiplex nodes are different in speed, then a difference Tc (=Ta–Tb) occurs in the time required for the two nodes to check the idle state (see FIG. 3 (b) and (c)). The symbols Ta and Tb (Ta>Tb) indicate the times required for the two multiplex nodes, which are related to the message A and the message B, respectively, to check the idle state of the multiplex bus from the moment the use of the multiplex bus (see FIG. 3 (a)) is finished.

Then, when the time Tb elapses from the moment the use of the multiplex bus is finished and one of the multiplex nodes verifies the idle state of the multiplex bus, causing the message B to be placed in the transmission state, the transmission of the message A is stopped by a carrier detecting function despite the fact that the priority level of the message A is higher than that of the message B. This means that the conventional multiplex transmission method has a problem that priority levels are ignored if there are variations in the bit length of the reference clocks of the multiplex nodes.

Further, the regular message format of a frame in the non-destructive arbitrative type CSMA/CD system consists of SOM (Start Of Message) which indicates the start of a message, data ID which indicates the contents of the data that follows, a data area of a specified length, an error check code such as CRC, an ACK signal area for causing all multiplex nodes to return receipt acknowledgment signal (ACK signal) on a bit basis, and EOM (End Of Message) which indicates the end of data, as shown in FIG. 1 (a). And when the message of the aforementioned format is transmitted, a receiving multiplex node first detects the rise of SOM of the message transmitted onto the multiplex bus to perform frame synchronization at the rise of SOM, and then it performs bit re-synchronization at the rising edge of the data.

If, however, SOM of the message consists of a special code comprising six bits in a dominant state (hereinafter referred to as dominant bits) as shown in FIG. 1 (b), and if a dominant bit follows immediately after the aforementioned SOM, then it takes more time to complete re-synchronization. More specifically, re-synchronization cannot be carried out as long as a dominant bit appears in succession in data; it cannot be carried out until a bit in a passive state (hereinafter referred to as a passive bit) and a dominant bit appear in succession following consecutive dominant bits.

Moreover, if there is a tolerance among multiplex nodes due to differences in the reference clock bit length, clock errors due to different clock speeds accumulate over the period from the moment the synchronization is made at the rise of SOM to the moment the re-synchronization is made at the rise of data.

Thus, the conventional synchronizing method in multiplex transmission has a problem in which bit synchronization cannot be performed and a bit error results if an accumulated clock error increases due to prolonged re-synchronization.

OBJECT AND SUMMARY OF THE INVENTION

An object of the present invention is to provide a multiplex transmission method which makes it possible to securely perform, at a low cost, priority-based control according to the priority levels of messages irrespective of variations in the reference clocks of multiplex nodes.

Another object of the present invention is to provide a synchronizing method in multiplex transmission, whereby bit synchronization can be securely performed irrespective of variations in the reference clocks of multiplex nodes.

According to one aspect of the present invention, a multiplex transmission method is provided, which allows data frames to be transmitted from a plurality of multiplex nodes to a common multiplex transmission line, when the multiplex transmission line is in an idle state. This multiplex transmission method comprises adding a transmission permission signal to a frame to be sent, and detecting the transmission permission signal through the multiplex nodes, and wherein the multiplex nodes are placed in a data frame transmission enable state when they detect the transmission permission signal.

Further, according to another aspect of the present invention, a synchronizing method in multiplex transmission is provided, wherein, when a multiplex transmission line common to a plurality of multiplex nodes is in an idle state, a data frame, which includes a start code, is sent from one of a plurality of transmitting multiplex nodes to the multiplex transmission line, while receiving multiplex nodes detect the start code to perform synchronization. This synchronizing method comprises adding a special bit pattern to the end of the start code, and detecting the special bit pattern code through receiving multiplex nodes, and wherein the receiving multiplex nodes detect the special bit pattern to carry out re-synchronization.

BRIEF DESCRIPTION OF THE DRAWINGS

FIGS. 1 (a) and 1 (b) are diagrams respectively showing a configuration of a message data frame and a waveform on a multiplex bus;

FIG. 2 is a waveform diagram used to illustrate the operation of the non-destructive arbitrative type CSMA/CD method;

FIG. 3 is a waveform diagram which illustrates a transmission state wherein priority levels are ignored due to variations in reference clocks;

DETAILED DESCRIPTION

The multiplex transmission method according to the first embodiment of the present invention will now be described with reference to FIG. 4 through FIG. 6.

The method of this embodiment is preferably applied to the multiplex transmission using the non-destructive arbitrative type CSMA/CD system, to an automotive multiplex transmission system, for example.

Figure 4:
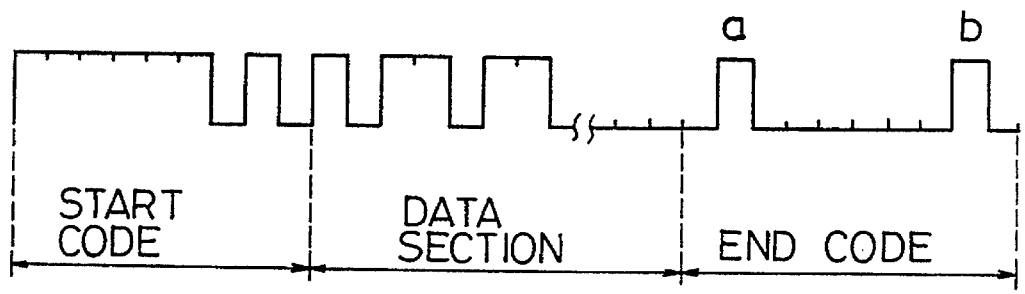
FIG. 4 is a diagram which illustrates, by way of example, a data frame format of a message used for the multiplex transmission method according to a first embodiment of the present invention.

As shown in FIG. 4, a message data frame (hereinafter referred to as message) used in the multiplex transmission method of this embodiment consists of a transmission start code, which indicates the start of transmission, a data section, and a transmission end code, which indicates the end of transmission. The data section consists of a priority (not shown), which includes data used to determine the priority level of messages when two or more multiplex nodes send messages to a multiplex bus at the same time, and, a data ID, a data area, an error check code and an ACK signal area which are shown in FIG. 1 (a). In other words, the message in this embodiment is different from the message of FIG. 1 (a) in that it includes the transmission start code and the transmission end code in place of SOM and EOM shown in FIG. 1 (a).

The transmission start code of a message consists of, for instance, nine bits. The 1st through 6th bits and the 8th bit are dominant bits, while the 7th and 9th bits are passive bits. The six consecutive dominant bits, which are the 1st through 6th bits of the transmission start code, correspond to the SOM of FIG. 1 (b) and they have a special pattern which does not normally appear in a message.

The transmission end code of the message functions to correct deviated synchronization, and it consists of ten bits, for example. The 1st and 2nd bits of the transmission end code are a passive bit and a dominant bit, respectively, the 3rd through 8th bits are passive bits, and the 9th and 10th bits are a dominant bit and a passive bit, respectively. The 1st and 2nd bits (at the leading or front part of the end code) constitute a synchronizing section or signal "a," the 3rd through 8th bits indicate the end of the message, and the 9th and 10th bits (at the end or rear part of the front code) constitute a transmission permission signal "b." The pattern composed of the six consecutive passive bits, and also the bit pattern of the aforementioned transmission end code, which is composed of the six passive bits, the synchronizing section or signal "a," and the transmission permission signal "b," is a special pattern that does not normally take place in a message.

In this embodiment, the NRZ (Non-Return to Zero) method is used for the data format. When five bits of the same sign appear in succession in frame data, a transmitting multiplex node always inserts one bit of an inversion sign immediately after the five bits, and a receiving multiplex node removes the inserted bit from the received data in a reversed manner. Accordingly, six or more passive bits do not appear in the frame data on the multiplex bus, making it possible to easily determine the end of a message when the transmission end code, which includes six consecutive passive bits, is detected.

Figure 5:
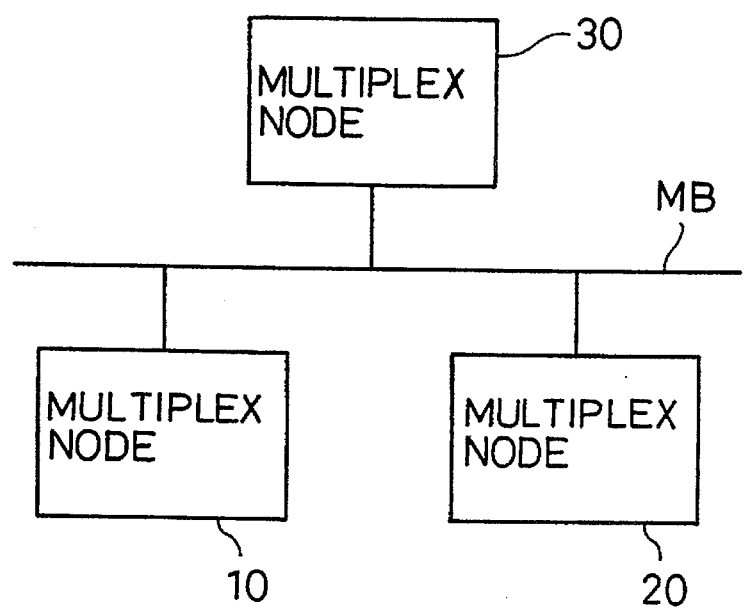
FIG. 5 is a schematic block diagram which shows a transmission system to which the multiplex transmission method according to the first embodiment applies.

Referring to FIG. 5, a system, to which the aforementioned multiplex transmission method is applied, is provided for data transmission in a motorcar, for example. The system is equipped with, for example, three multiplex nodes 10, 20 and 30, which are connected to a common multiplex bus MB and which constitute a network in conjunction with the multiplex bus to perform message transmission, frame by frame, between these multiplex nodes. The multiplex nodes 10, 20 and 30 preferably consist of computers that are equipped with functions for vehicle control such as arithmetic operation and discriminating functions and that can be operated independently from one another. For instance, these multiplex nodes consist of an engine computer for primarily controlling fuel injection, an antilock traction computer for primarily controlling the driving force applied to wheels, and a transmission computer for controlling the transmission, respectively. When each of the multiplex nodes 10, 20, and 30 detects six or more passive bits in succession on the multiplex bus MB, i.e., when the passive state continues on the multiplex bus for more than a predetermined time period, they determine that the multiplex bus MB is in the idle state, and they are allowed to start message transmission.

The operation of the system shown in FIG. 5 will now be described with reference to FIG. 6.

Figure 6:
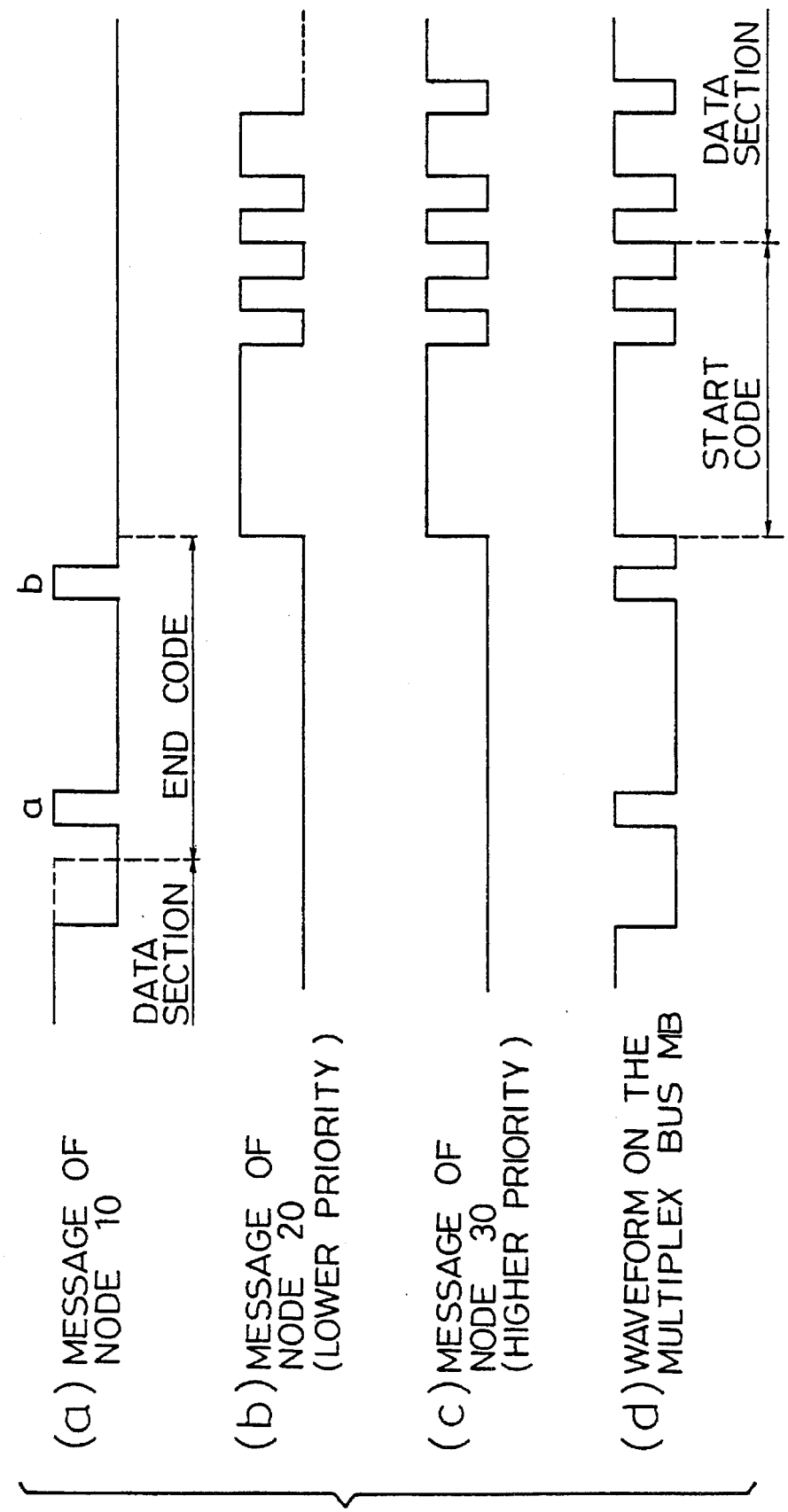
FIG. 6 is a waveform diagram used to explain the operation of the transmission system shown in FIG. 5.

It is assumed that a message is being transmitted from the multiplex node 10 onto the multiplex bus MB (see FIG. 6 (a)). While the message is being sent from the transmission multiplex node 10, the receiving multiplex nodes 20 and 30 are in a transmission wait state (see FIGS. 6 (b) and (c)). Then, when the transmission end code of the message is sent from the multiplex node 10 following the data section of the message, both the multiplex nodes 20 and 30 perform synchronization at the synchronizing section or signal "a" at the leading part of the transmission end code, thereby preventing the synchronization of the reference clocks between the two multiplex nodes from being deviated. Next, when the multiplex nodes 20 and 30 detect six passive bits of the transmission end code in succession following the synchronizing section "a," they discriminate the end of the message, implement re-synchronization at the rise of the transmission permission signal "b" at the end part of the end code following the six passive bits, and start the message transmission upon detection of the end of the transmission permission signal "b" (see FIGS. 6 (b) and (c)).

Here, if the priority level of the message of the multiplex node 30 is higher than that of the multiplex node 20, then the transmission waveform of the multiplex node 20 is different from the waveform on the multiplex bus MB (see FIG. 6 (d)); therefore, the multiplex node 20 judges by a carrier detecting function that it is a signal collision and stops the transmission of the message. Thus, as a result of the implementation of the non-destructive priority-based control, only the message of the multiplex node 30 exists on the multiplex bus MB.

As described above, in this embodiment, the synchronization of competing multiplex nodes is performed immediately before (2 bits before) the start of the transmission of the next frame in accordance with the transmission end code "b" added to the end of a message, thus correcting deviated synchronization among competing multiplex nodes. In addition, these multiplex nodes verify the idle state of the multiplex bus MB at the same time when the synchronization is performed at the synchronizing section "a" of the transmission end code. As a result, one or more competing multiplex nodes verify the idle state earlier than the remaining multiplex nodes and proceed to the transmission of the frame, eliminating the possibility of improper priority-based control being carried out. In other words, proper priority-based control is performed in accordance with the priority levels of messages sent from the competing multiplex nodes. Further, it is unnecessary to correct the variations in clock time primarily caused by the variations in the devices of the clock generating sources of the multiplex nodes, thus making it possible to achieve accurate priority-based control at a low cost.

A multiplex transmission method according to a second embodiment of the present invention will now be explained with reference to FIG. 7 and FIG. 8.

In comparison with the aforementioned first embodiment, which uses the transmission end code consisting of the synchronizing section "a," the six passive bits, and the transmission permission signal "b," the method according to this embodiment is different primarily in that its transmission end code consists of only the synchronizing section "a" and six passive bits, and its transmission permission signal b' consists of only one dominant bit, in place of the transmission permission signal "b" which consists of one dominant bit and one passive bit.

The operation of the transmission system shown in FIG. 5, to which the method according to this embodiment is applied, will now be described with reference to FIG. 7.

Figure 7:
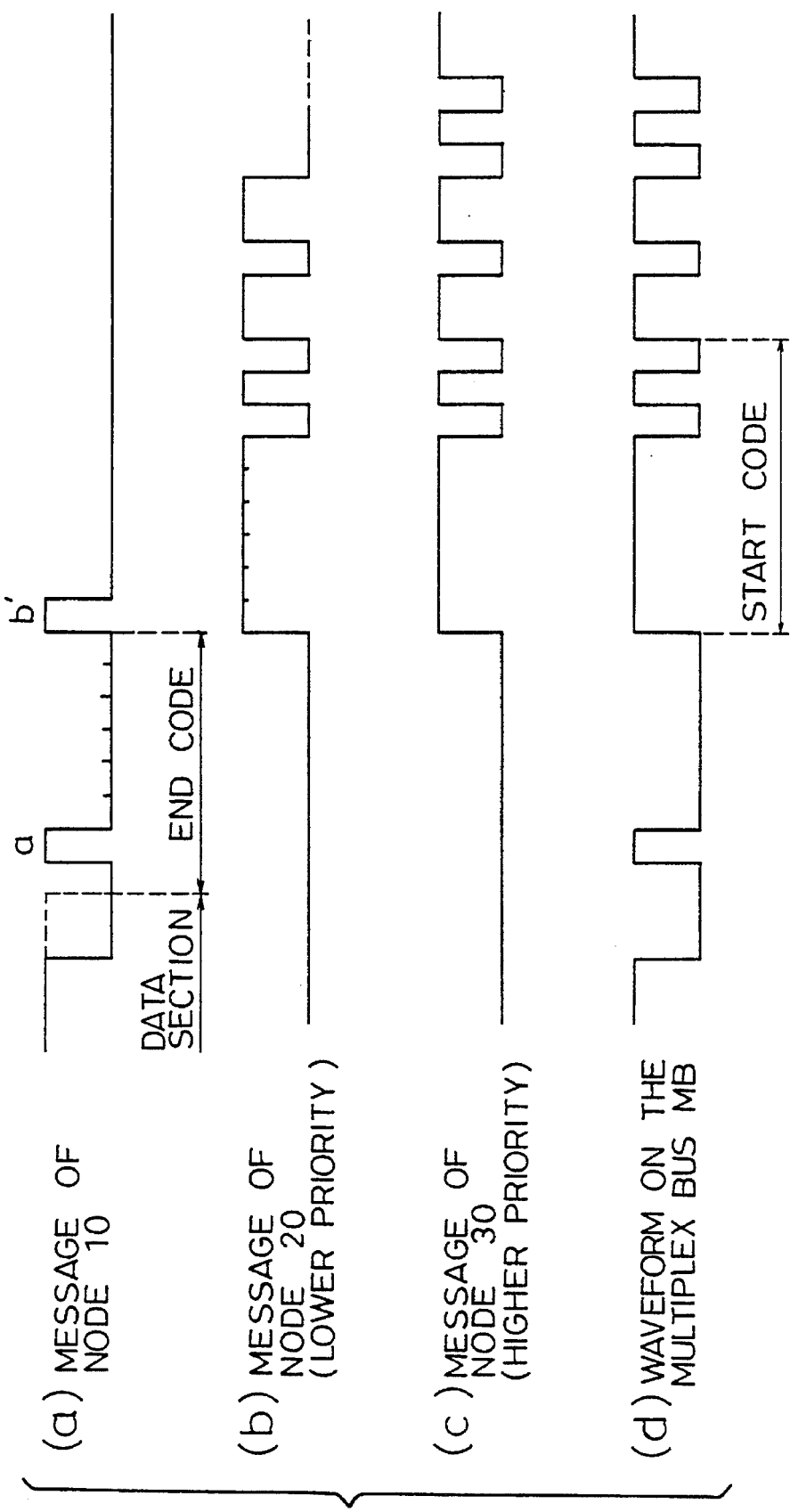
FIG. 7 is a waveform diagram used to explain the operation of a transmission system to which the multiplex transmission method according to a second embodiment of the present invention applies.
Figure 8:
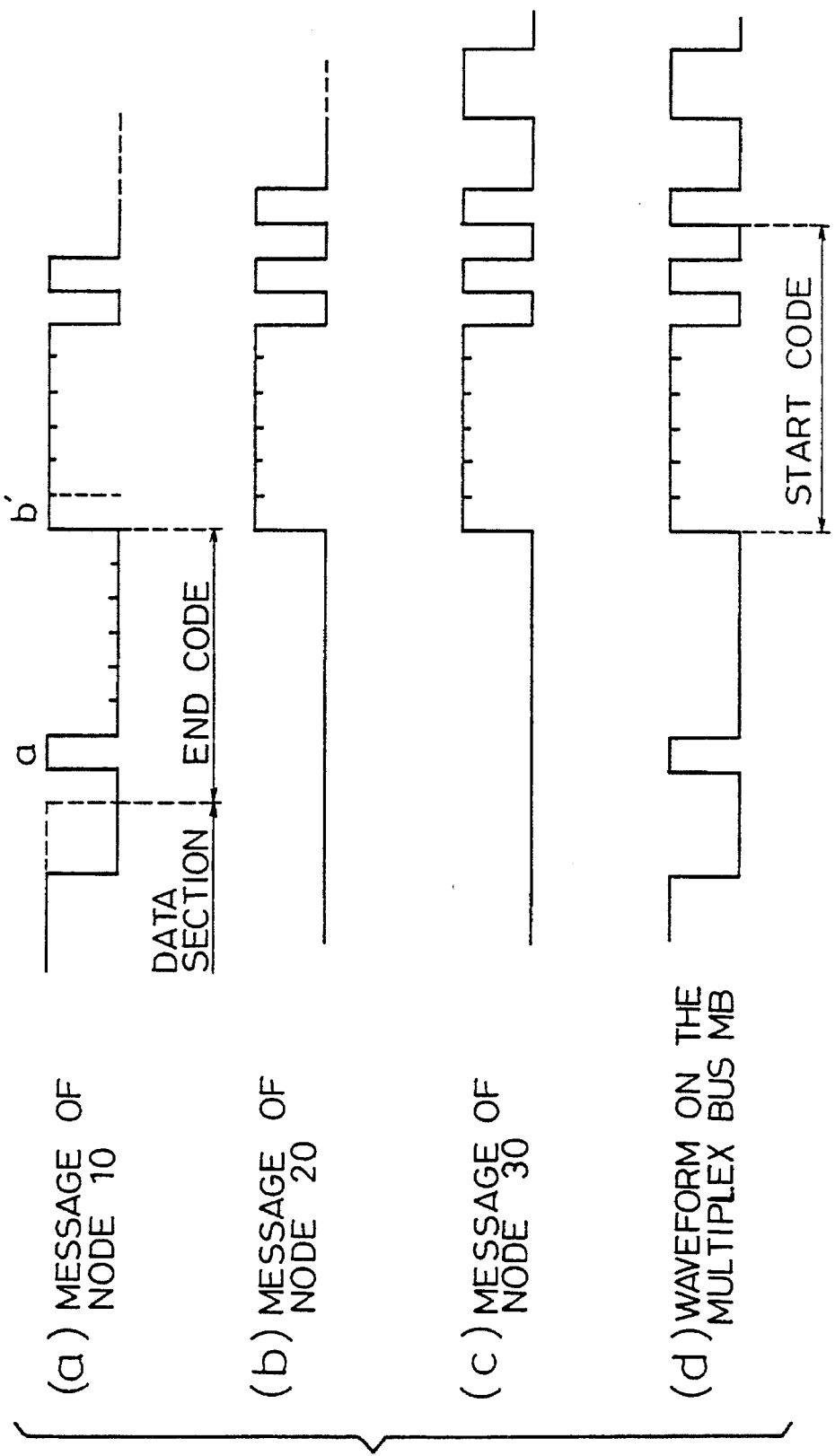
FIG. 8 is a waveform diagram used to explain the operation of the transmission system related to the second embodiment when a data frame is re-transmitted.

As shown in FIG. 7, while a message is being transmitted from the multiplex node 10 onto the multiplex bus MB (see FIG. 7 (a)), the multiplex nodes 20 and 30 are in the transmission wait state. After that, the multiplex nodes 20 and 30 detect the transmission permission signal "a" in the transmission end code sent from the transmitting multiplex node 10 to perform synchronization, discriminate the idle state of the multiplex bus MB by detecting the six consecutive passive bits in the transmission end code, and begin transmitting the message following the rise of the transmission permission signal b' which follows the transmission end code (see FIGS. 7 (b) and (c)). Then, as in the case of the first embodiment, the multiplex node 20 stops the transmission of the message of a priority level that is lower than that of the message transmitted from the multiplex node 30 by the non-destructive, priority-based control using the collision detecting function.

A case, wherein the multiplex nodes 10, 20, and 30 begin transmission following the transmission of the multiplex node 10, will now be described with reference to FIG. 8.

For instance, there is a case wherein, when a frame transmitted by the multiplex node 10 is received, if one or both of the receiving multiplex nodes 20 and 30 on a network detect a transmission error and therefore the receipt acknowledge signal from one or both of the multiplex nodes is not sent to a corresponding address in the ACK signal area of the transmitted frame, the multiplex node 10 re-transmits the frame. In this case, the multiplex node 10 starts re-transmission following the rise of its own transmission permission signal b'. Thus, the multiplex node 10 follows the transmission permission signal b' of its own node; therefore, the transmission permission signal b' and the start code seemingly overlap each other (see FIG. 8 (a)).

Then, the nodes 20 and 30, which have been waiting for transmission, also begin the transmission of a message frame following the rise of the transmission permission signal b' from the node 10. As in the case of the aforementioned first embodiment, only the message frame with the top priority is transmitted until the transmission of the transmission permission signal b' added to the end of the frame is completed.

In the explanation of the above first and second embodiments, it was assumed that there was already a multiplex node which was sending a message to the multiplex bus MB. It is needless to say that, when the multiplex bus MB is in the idle state, a multiplex node, which receives a transmission request, immediately begins transmission.

Figure 9:
FIG. 9 is a diagram which shows a transmission start code used in modifications of the first and second embodiments.

The transmission start code used in the first and second embodiments can be modified. For example, as shown in FIG. 9, the transmission start code can be comprised of six dominant bits, one passive bit, and one dominant bit.

Figure 10:
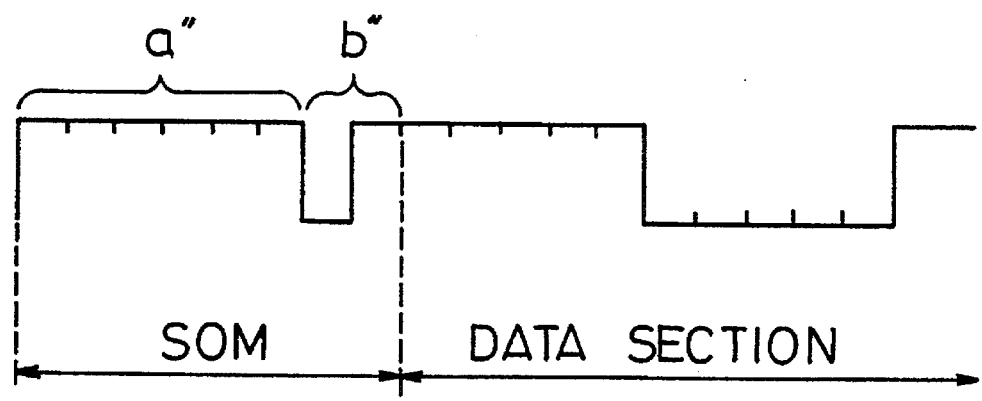
FIG. 10 is a diagram which illustrates by way of example, a frame start code of a message used for the synchronizing method in multiplex transmission according to a third embodiment of the present invention.

A synchronizing method in multiplex transmission according to a third embodiment of the present invention will now be described with reference to FIG. 10.

The multiplex transmission method according to this embodiment uses a digital transmission system where the NRZ (Non-Return to Zero) code is employed as the transmission code, and a stuff bit is inserted into the aforementioned NRZ code so that the stuff bit is used for performing synchronization.

The message frame according to this embodiment has the same configuration as that shown in FIG. 1 (a) except for the SOM (frame start code) area. For this reason, FIG. 10 mainly shows only the configuration of the SOM related to the embodiment. Referring to FIG. 10, the SOM is composed of a special code a" corresponds to SOM shown in FIG. 1) consisting of six dominant bits, which breaks the stuff bit rule, and a special synchronization bit pattern b" consisting of one passive bit and one dominant bit. Thus, by providing the special bit pattern b" following the special code a", corresponding to the conventionally known SOM, all the multiplex nodes carry out re-synchronization at the rising edge of the special bit pattern b" to prevent synchronization from being deviated, even if bits of the same sign as that of the special code a" of the SOM are transmitted in succession following the SOM shown in FIG. 10.

As in the case of the first embodiment described above, in this embodiment, a transmitting multiplex node inserts one bit of an inversion sign whenever the same sign appears consecutively for five bits in frame data, while a receiving multiplex node removes the inserted bit in a reversed manner. Accordingly, six or more passive bits do not appear in succession in frame data on the multiplex bus, so that the end of a message can be easily determined.

The operation of the transmission system in FIG. 5, to which the synchronizing method in multiplex transmission according to this embodiment is applied, will now be described. The transmission system shown in FIG. 5 has already been explained in relation to the aforementioned first embodiment; therefore, the explanation of the configuration will be omitted.

In FIG. 5, the multiplex node 10 serves as a transmitting node, while the multiplex nodes 20 and 30 serve as the receiving nodes. When the transmitting multiplex node 10 detects that the multiplex bus MB is in the idle state, it starts the transmission of a message and sends out the SOM consisting of the special code a" and the special bit pattern b" to the multiplex bus MB.

The receiving multiplex nodes 20 and 30 detect the rise of the special code a" received from the transmitting multiplex node 10, and perform frame synchronization at the aforementioned rising edge. Further, they detect the rise of the special synchronization bit pattern b" consisting of a passive bit and a dominant bit arranged just before the data section (see FIG. 10), perform bit synchronization at the rising edge, and take in the frame data that follows.

As described above, in this embodiment, the SOM of a message is comprised of the special code a" and the special synchronization bit pattern b", and re-synchronization is implemented at the rising edge of the special bit pattern b". This makes it possible to securely perform synchronization even if the same sign as that of the special code "a" of the SOM follows the SOM, thus preventing synchronization from being deviated due to clock tolerances or the like and the consequent bit errors.

The present invention provides the advantages listed below:

(1) Since the transmission permission signal is added to the end of every frame transmitted to the multiplex transmission line, and since a multiplex node waiting for transmission starts the transmission of a frame when it detects the aforementioned transmission permission signal or the idle state of the transmission line, priority-based control can be carried out according to the priority levels of messages securely and at a low cost even if there are variations in the reference clocks among competing multiplex nodes.

(2) The special bit pattern is added to the end of the start code of a frame to be transmitted to the multiplex transmission line, and the aforesaid receiving multiplex nodes detect the special code and perform re-synchronization at the rise of the aforementioned bit pattern. This makes it possible to securely implement bit synchronization without being influenced by variations in the reference clocks of the multiplex nodes, permitting higher reliability of multiplex transmission. In addition, even if the same sign as that of the aforementioned start code follows the start code, a shorter time is only required for performing re-synchronization, enabling prevention of deviated synchronization and assuring implementation of synchronization.

The present invention is not limited to the above first through third embodiments, but it may be modified in various manners. For instance, in the above first through third embodiments, the cases, wherein the present invention was applied to an automotive multiplex transmission system, were explained, but the multiplex transmission method and the synchronizing method in multiplex transmission according to the present invention may also be applicable to diverse transmission systems.

In addition, the present invention may be modified to include the characteristics of the first or second embodiment and the characteristics of the third embodiment.

What is claimed is:

1. A multiplex transmission method which allows transmission of a data frame from each of a plurality of multiplex nodes to a multiplex transmission line when the multiplex transmission line is in an idle state, the multiplex transmission line being commonly connected to the plurality of multiplex nodes comprising the steps of:

adding a transmission permission signal to a data frame to be transmitted;

providing a synchronizing signal to a leading part of an end code of the data frame to be transmitted;

detecting said transmission permission signal by each multiplex node of said plurality of multiplex nodes, each said multiplex node being placed in a frame transmission enable state when the multiplex node detects said transmission permission signal;

adding said transmission permission signal to the data frame immediately after a code having a pattern which normally does not appear in a data frame, said transmission permission signal including a bit of a sign opposite from that of said code.

2. The multiplex transmission method according to claim 1, wherein said transmission permission signal is added to an end part of the end code of the data frame to be transmitted.

3. A synchronizing method in multiplex transmission wherein a data frame including a start code is sent from a transmitting multiplex node, which corresponds to one of a plurality of multiplex nodes, to a multiplex transmission line which is connected in common to the plurality of multiplex nodes, when the multiplex transmission line is in an idle state, and wherein receiving multiplex nodes, which correspond to multiplex nodes other than said transmitting multiplex node, detect said start code to perform synchronization, comprising the steps of:

adding a special bit pattern to an end of said start code;

providing a synchronizing signal to a leading part of an end code of the data frame to be transmitted;

detecting said special bit pattern by said respective receiving multiplex nodes, said respective receiving multiplex nodes being operable to detect said special bit pattern to thereby implement resynchronization.

4. The synchronizing method according to claim 3, wherein said special bit pattern comprises a passive bit and a dominant bit, and wherein said receiving multiplex nodes implement re-synchronization at a time instant at which a shift is made from the dominant bit to the passive bit in said special bit pattern.

* * * * *